US011520473B2

(12) United States Patent
Moreno et al.

(10) Patent No.: US 11,520,473 B2
(45) Date of Patent: Dec. 6, 2022

(54) SWITCH CONTROL FOR ANIMATIONS

(71) Applicant: SAP SE, Walldorf (DE)

(72) Inventors: Sebastian Moreno, Heidelberg (DE); Annette Jann, Heidelberg (DE); Roman Rommel, Neustadt an der Weinstrasse (DE)

(73) Assignee: SAP SE, Walldorf (DE)

( * ) Notice: Subject to any disclaimer, the term of this patent is extended or adjusted under 35 U.S.C. 154(b) by 857 days.

(21) Appl. No.: 15/609,978

(22) Filed: May 31, 2017

(65) Prior Publication Data
US 2018/0349003 A1 Dec. 6, 2018

(51) Int. Cl.
*G06F 3/04847* (2022.01)
*G06F 3/0483* (2013.01)
*G06F 3/0482* (2013.01)
*G06F 9/451* (2018.01)
*G06T 13/00* (2011.01)
G06F 3/04817 (2022.01)
G06T 13/80 (2011.01)

(52) U.S. Cl.
CPC ........ *G06F 3/04847* (2013.01); *G06F 3/0482* (2013.01); *G06F 3/0483* (2013.01); *G06F 9/451* (2018.02); *G06T 13/00* (2013.01); *G06F 3/04817* (2013.01); *G06T 13/80* (2013.01); *G06T 2200/24* (2013.01)

(58) Field of Classification Search
CPC ............. G06F 3/04847; G06F 3/04817; G06F 3/0482; G06F 3/0483; G06T 13/80
USPC ................... 715/733, 762; 345/473; 455/566
See application file for complete search history.

(56) References Cited

U.S. PATENT DOCUMENTS

| 8,744,903 | B2 | 6/2014 | Waguet et al. | |
|---|---|---|---|---|
| 9,348,609 | B2 | 5/2016 | Balko et al. | |
| 9,558,171 | B2 | 1/2017 | Christoph et al. | |
| D816,104 | S | 4/2018 | Rauschenbach et al. | |
| D827,656 | S | 9/2018 | Rauschenbach et al. | |
| 10,152,204 | B2 | 12/2018 | Jann et al. | |
| 2005/0050438 | A1* | 3/2005 | Cheung | G06F 9/453 |
| | | | | 715/206 |
| 2010/0317408 | A1* | 12/2010 | Ferren | G06F 1/3265 |
| | | | | 455/566 |
| 2015/0134495 | A1* | 5/2015 | Naware | G06T 19/20 |
| | | | | 705/27.2 |
| 2016/0180567 | A1* | 6/2016 | Lee | G06F 3/048 |
| | | | | 345/473 |

(Continued)

OTHER PUBLICATIONS

U.S. Appl. No. 15/865,961, Rommel et al., filed Jan. 9, 2018.
U.S. Appl. No. 16/161,245, Kaiser et al., filed Oct. 16, 2018.

*Primary Examiner* — Ruay Ho
(74) *Attorney, Agent, or Firm* — Fish & Richardson P.C.

(57) ABSTRACT

In one general aspect, a method can include receiving, in a user interface of a first page of an application executing on a computing device, a selection of an animation option, receiving, in a user interface of a second page of the application executing on the computing device, a selection of an icon. In response to receiving the selection of the icon, the method can further include launching a third page of the application, and performing an animation of a visual presentation of the launching of the third page of the application from the second page of the application. The animation can be based on the received animation option selection.

20 Claims, 13 Drawing Sheets

(56) References Cited

U.S. PATENT DOCUMENTS

| | | |
|---|---|---|
| 2016/0378303 A1* | 12/2016 | Crilley .................. G06T 13/80 |
| | | 715/733 |
| 2017/0329581 A1 | 3/2017 | Jann et al. |
| 2017/0329466 A1 | 11/2017 | Krenkler et al. |
| 2017/0329499 A1 | 11/2017 | Rauschenbach et al. |
| 2017/0329580 A1 | 11/2017 | Jann et al. |
| 2017/0329630 A1 | 11/2017 | Jann et al. |
| 2018/0107347 A1 | 4/2018 | Blinn et al. |
| 2018/0229122 A1* | 8/2018 | Sherr ................... A63F 13/537 |
| 2019/0065442 A1 | 2/2019 | Rommel et al. |

* cited by examiner

```
&--open {
    .viewPort__contentArea__overlay {
        left: 0;
        width: calc(~'80% - @{notificationAreaWidth}');
        display: inline-block;
    }

&.notificationList--hide {
        .viewPort__content {
            animation: slideOutContentOnNotificationAreaLaunchpdOpen @animationSpeed forwards;
        }
    }
}

&--close {
    &.notificationList--hide {
        .viewPort__content {
            animation: slideInContentOnNotificationAreaLaunchpdClose @animationSpeed forwards;
        }
    }
}
```

```
600 ~>
        .viewport {
   602 ~>  &--animation-off {
              Animation: none !important;
           }
        }
```

FIG. 6

```
706 ~> // Animation Switch
       &.animation--light {
          .viewPort__meArea {
             &--open {
                .viewPort__content {
700 ~>         animation: slideOutContentOnMeAreaOpenAniamtionLight @animationSpeed forwards;   ~702
                }
             }
             &--close {
                .viewPort__content {
                   animation: slideInContentOnMeAreaCloseAniamtionLight @animationSpeed forwards;  ~704
                }
             }
          }
       }
```

FIG. 7

```
Viewport.prototype.setAnimationType = function (sType) {
    if (sType ==="full") {
        this.setProperty("animationType", "full", true);
        this._viewport.removeStyleClass("animation—light");
        this.enableBackgroundAnimation();
    }
    else {
        this._viewport.addStyleClass("animation—light");
        this.setProperty("animationType", "light", true);
        this.disableBackgroundAnimation();
    }
};
```

```
onAnimationTypeChange: function (e) {
    var view = this.getView().byId("aniamtionType");
    var selectedType = view.getSelectedKey();
    AnimationSwitch.setType(selectedType);
    ...
}
```

```
return (function () {
    "use strict";                 ⟋1002                                              ⟋1000
    var animationSwitch = {
        type: "full",
        get animationType() {
            //get animation type from the backend
            return localstorage.getItem("animationType") || this.type;
        },
        set animationType(sType) {
            if (sType === "full" || sTyep === "light" || sType === "off") {
                //persist animation type in backend
                localstorage.setItem("animationType", sType);
                this.type = sType;
            }
            else {
                console.error("Unknown animation type.  Must be (full|light|off);
            }
        },
    };
    return {
        getType: function () {
            return animationSwitch.animationType;
        },
        setType: function (sType) {
            try {
                animationSwitch.animationTyoe = sType;
            } catch(e) {
                console.error("Error while setting animation type" + e);
            }
        }
    }
    ...
};
```

FIG. 10

SWITCH CONTROL FOR ANIMATIONS

TECHNICAL FIELD

This description generally relates to user interfaces. The description, in particular, relates to systems and techniques for providing a user interface experience for viewing data and information related to multiple software applications.

BACKGROUND

A user of software applications designed to support processes used by an enterprise often needs to navigate back and forth between multiple (and in many cases different) user interfaces and application instances in order to carry out transactional tasks when making a viable decision for the enterprise. In many cases, the navigation can include viewing data and information related to multiple applications. Navigating between multiple pages and user interfaces for an application can include animations and micro-interactions making for a more interesting and pleasant user experience.

SUMMARY

According to one general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method can include receiving, in a user interface of a first page of an application executing on a computing device, a selection of an animation option, receiving, in a user interface of a second page of the application executing on the computing device, a selection of an icon, in response to receiving the selection of the icon, launching a third page of the application, and performing an animation of a visual presentation of the launching of the third page of the application from the second page of the application, the animation being based on the received animation option selection.

Implementations may include one or more of the following features. For example, the animation option can be one of a full option, a basic option, or a minimal option. The method can further include identifying an animation mode of operation based on the received animation option selection. An animation action can be associated with the identified animation mode of operation. The animation action can determine the performing of the animation of the visual presentation of the launching of the third page of the application from the second page of the application by the computing device. The animation can be further based on a type of computing device. The visual presentation can include a busy indicator.

In another general aspect, a non-transitory, machine-readable medium have instructions stored thereon. The instructions, when executed by a processor, can cause a computing device to receive, in a user interface of a first page of an application executing on a computing device, a selection of an animation option, receive, in a user interface of a second page of the application executing on the computing device, a selection of an icon, in response to receiving the selection of the icon, launch a third page of the application, and perform an animation of a visual presentation of the launching of the third page of the application from the second page of the application, the animation being based on the received animation option selection.

Implementations may include one or more of the following features. For example, the animation option can be one of a full option, a basic option, or a minimal option. The instructions, when executed by the processor, further cause the computing device to identify an animation mode of operation based on the received animation option selection. An animation action can be associated with the identified animation mode of operation. The animation action can determine the performing of the animation of the visual presentation of the launching of the third page of the application from the second page of the application by the computing device. The animation can be further based on a type of computing device. The visual presentation can include a busy indicator.

In yet another general aspect, a system can include a computer system including an animation control module, and a computing device including a display device. The computing device can be configured to receive, in a user interface of a first page of an application executing on a computing device, a selection of an animation option, provide the selected animation option to the computer system for use by the animation control module, receive, in a user interface of a second page of the application executing on the computing device, a selection of an icon, in response to receiving the selection of the icon, launch a third page of the application, and perform an animation of a visual presentation of the launching of the third page of the application from the second page of the application, the animation being based on the received animation option selection.

Implementations may include one or more of the following features. For example, the selected animation option can be stored in a database accessible by the computer system. The animation option can be one of a full option, a basic option, or a minimal option. The animation control module can be configured to identify an animation mode of operation based on the selected animation option. The animation control module can be further configured to associate an animation action with the identified animation mode of operation. The animation action can determine how the animating of the visual presentation of the launching of the third page of the application from the second page of the application is performed by the computing device. The animation can be further based on a type of computing device.

The details of one or more implementations are set forth in the accompanying drawings and the description below. Other features will be apparent from the description and drawings, and from the claims.

BRIEF DESCRIPTION OF THE DRAWINGS

FIG. 5 shows an example of program code for a software application that enables an animation by setting a name of the animation.

FIG. 6 shows an example of program code for a software application that shows how animations can be turned off at a control level.

FIG. 7 shows an example of program code for a software application that shows how a basic mode of animation can be implemented in the software application.

FIG. 8 shows an example of program code for a software application that shows how adding an animation—light class to a viewport can lead to a replacement of the animation name for the viewport.

FIG. 9 shows an example of program code for a software application that shows how switching an animation mode in a me area can trigger an event to modify an animation type.

FIG. 10 shows an example of program code for a software application that shows an animationSwitch class that can be used to persist settings when an animation type is changed.

Like reference symbols in the various drawings indicate like elements.

DETAILED DESCRIPTION

Figure 1A:
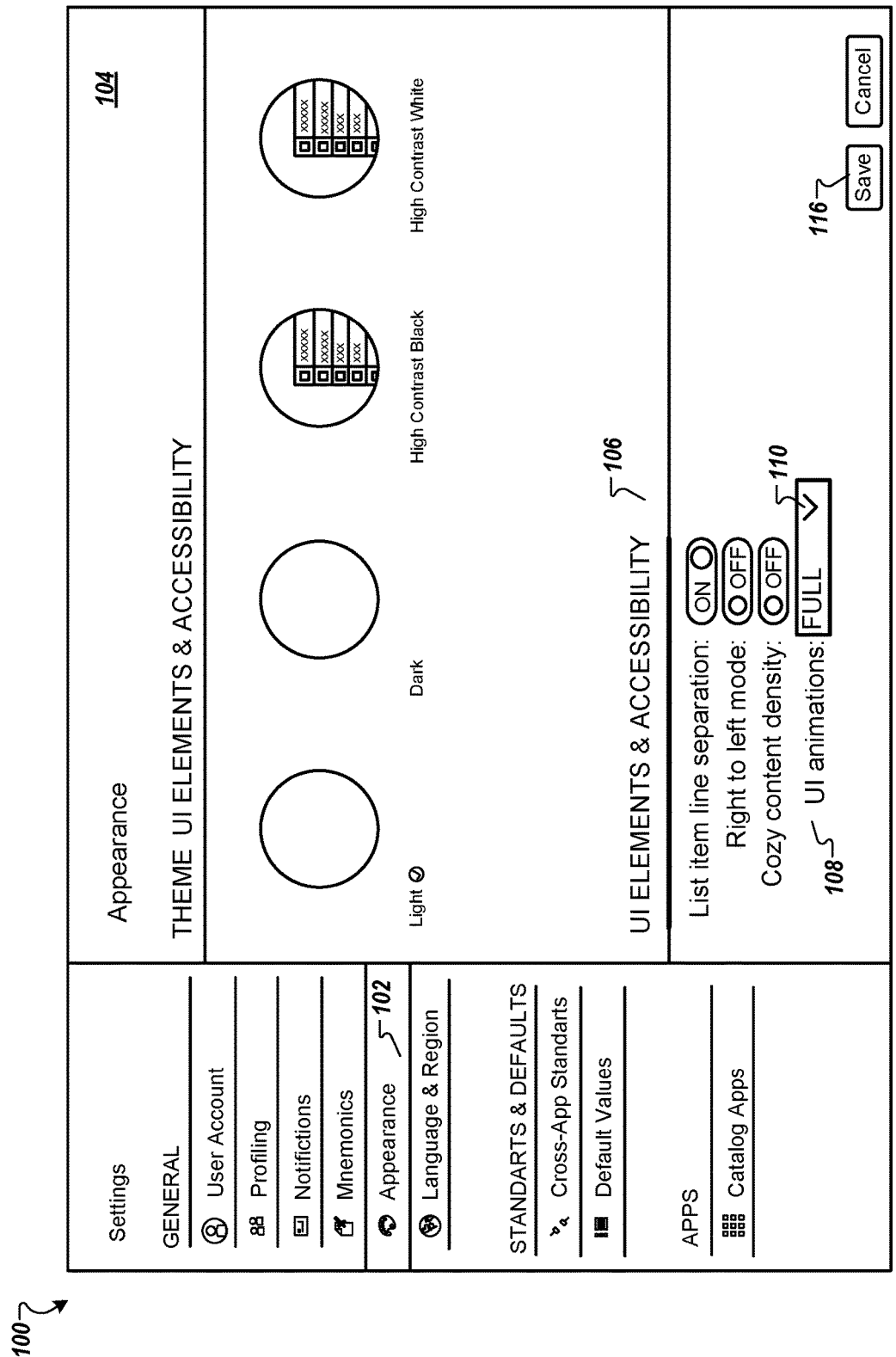
FIG. 1A is an illustration of an example settings user interface (UI) for a software application such as an enterprise application

Enterprise applications that are associated with transactional workflows in an enterprise can be implemented using a software development technology or foundation (e.g., HTML5/CSS/JS technology) in a particular user interface (UI) framework (e.g., SAPUI5) in order to provide a beneficial user experience (UX) and UI. The enterprise applications can be implemented to execute or run on multiple different types of computing devices such as desktop computers and mobile computing devices (e.g., laptop computers, tablet computers, notebook computers, personal digital assistants (PDAs), smartphones, mobile phones, smart watches, etc.).

For example, the UI may use elements of a particular UX (e.g., an SAP Fiori® UX) to provide a user with a personalized, responsive, seamless, and simple user experience across enterprise applications (including legacy and new), across different types of computing devices such as desktop computers and mobile computing devices (e.g., laptop computers, tablet computers, notebook computers, personal digital assistants (PDAs), smartphones, mobile phones, smart watches, etc.), and across all possible deployment options (e.g., on-premise, cloud, as-a-service, etc.).

The particular UX can deploy an array of interactive features and process tools that can be integrated with a suite or set of enterprise applications that have specific functionalities. The particular UX can provide intelligent, contextual-based support for users across an enterprise. The particular UX can use a "push" model that can anticipate tasks (e.g., transactional tasks) for a user based on a role of the user in the enterprise. The particular UX can import real-time data that can be tailored to specific tasks. The software for the UI for the particular UX can be implemented to easily and transparently scale the UI accordingly for display on each display device included in each of the different possible computing devices that can execute (run) the enterprise applications.

The UX can be enhanced by using animations and micro-interactions. In some implementations, a user may want to limit the use of animations and micro-interactions for the UI of an application based on a variety of factors that can be related to the user, the perceived performance of the application, or the performance of the computing device. In some implementations, the user may want to limit the use of animations and micro-interactions for the UI of an application in order to extend the battery life of the computing device and as a result the operating time of the computing device. For example, a graphics processing unit (GPU) included in the computing device may perform the operations needed to implement the animations and micro-interactions. Limiting the use of the GPU can reduce the amount of power consumed by the computing device resulting in lower battery consumption. An application can provide a user interface that can allow a user to select various levels of animation that can be implemented by the UI of the application when providing a UX to the user.

FIG. 1A is an illustration of an example settings user interface (UI) 100 for a software application such as an enterprise application. Selectable settings options and controls included in the settings UI 100 can allow a user to customize their UX when interfacing with the enterprise application. For example, a user can select an appearance settings option 102. Responsive to the selection, an appearance UI 104 can be displayed in the settings UI 100. The appearance UI 104 includes a UI elements and accessibility control section 106 that includes a selectable UI animation control 108. In the example setting UI 100, the selectable UI animation control 108 has been set to "full" indicating that all animations and micro-interactions are enabled for the enterprise application. A user can select a pull-down menu icon 110 that can display additional options for the setting of the UI animation control 108 as shown in FIG. 1B.

Figure 1B:
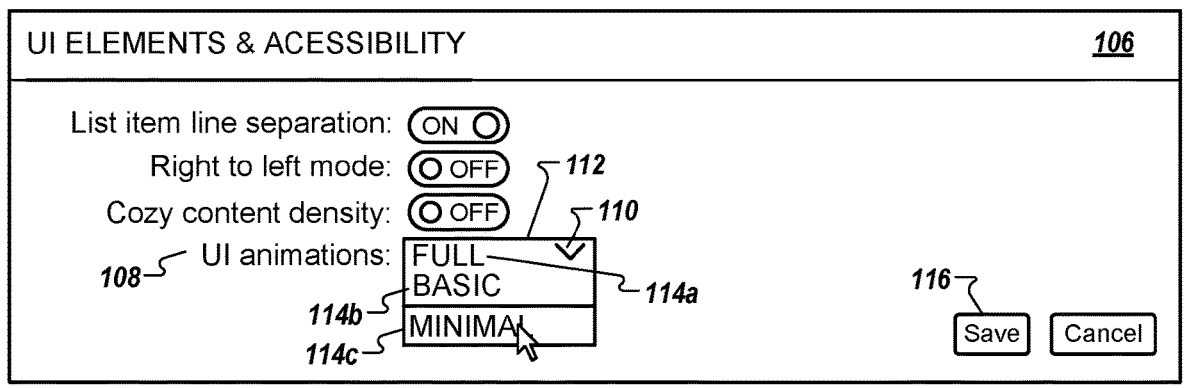
FIG. 1B is an illustration of an example pull-down menu for the selectable UI animation control.

FIG. 1B is an illustration of an example pull-down menu 112 for the UI animation control 108. In the example pull-down menu 112 a user can select one of three available options 114*a-c* for how animations and micro-interactions are implemented by the enterprise application. The selection of a full option 114*a* enables all animations and micro-interactions for the enterprise application to be shown to the user. The selection of a minimal option 114*c* disables most animations and micro-interactions for the enterprise application, showing the user a minimal number of animations and micro-interactions for the enterprise application in order for the user to interact with the UI of the enterprise application. In some implementations, the selection of a minimal option 114*c* may disable all animations and micro-interactions for the enterprise application. The selection of a basic option 114*b* can enable some but not all of the animations and micro-interactions for the enterprise application to be shown to the user. For example, when the basic option 114*b* is selected, the animations and micro-interactions considered to be the most important will be implemented and shown by the enterprise application. Selecting the basic option 114*b* enable more animations and micro-interactions for the enterprise application than are enabled by the selection of the minimal option 114*c*.

Once the user has made a selection, selecting a save button 116 can save the selected option for the UI animation control 108. The enterprise application can use the selected option for the UI animation control 108 to control how animation and micro-interactions are implemented by the enterprise application.

Though the example pull-down menu 112 for the UI animation control 108 shown in FIG. 1B shows three user selectable options, in some implementations, more than three options can be available to a user for selection. For example, a full option and a minimal option can be included with multiple additional options for allowing some but not all animations and micro-interactions for the enterprise application. The additional options may include options that indicate a percentage of the enabled the animations and micro-interactions for the enterprise application (e.g., a 25% enabled option, a 50% enabled option, and a 75% enabled option).

In some implementations, a user can be provided with an additional user control that would allow customization of the amount of enabled animations and micro-interactions for the enterprise application. For example, on selection of the basic option 114b, a user can be presented with a UI that allows the user to enter a percentage of animations and micro-interactions to enable for the enterprise application.

In some implementations, a developer of the enterprise application may be able to arrange or categorize animations and micro-interactions for the enterprise application when enabling the amount of animations and micro-interactions for the enterprise application. For example, a base number or default number of animations and micro-interactions may always be enabled while particular groups of animations and micro-interactions may be enabled depending on a selectable user option.

In some implementations, user input and feedback can be used to determine a classification for animations and micro-interactions. For example, animations and micro-interactions considered relevant to a user can be classified as more important than animations and micro-interactions considered less relevant to a user. For example, the more important animations and micro-interactions can be enabled in the minimal mode. The enterprise application can implement these more important animations and micro-interactions while switching off other less important animations and micro-interactions. The impact on the perceived performance of the application by the user can be controlled by the number of the enabled important animations and micro-interactions. In addition or in the alternative, a level of animation (an animation action) for an enabled animation can be determined that minimizes an impact of the animation on the performance of the enterprise application. The determined level of animation (the animation action) can minimize the computing resources used by the animation.

In some implementations, animations can be categorized into one of three classes. A first class of animations (class one) can include front-end only animations that may not be performance critical. A second class of animations (class 2) can include page navigation animations that animate a transition from one page to another of the enterprise application. When performing page navigation animations the sequence of the animations can be critical. In some cases, the page navigation animations may conflict with content rendering on a page. The performance of page navigation animations can be considered critical in order for a user to have a positive UX. A third class of animations (class 3) can include busy indicators. The performance of the animating of many busy indicators can be considered critical in order for a user to have a positive UX. In some cases, the amount of computing resources used by the animation of busy indicators may negatively affect the battery life of a battery-powered mobile computing device.

In some implementations, an animation action associated with an animation can be varied depending on the selected animation option. For example, in general, when the full option 114a is selected, the animation action can be more complex. When the minimal option 114c is selected, the animation action can be less complex and can be considered a minimal animation action. In general, a more complex animation action will use more computing resources than a less complex animation action.

FIGS. 2A-D show example user interfaces (UI) for non-performance critical front-end only animations for an enterprise application. For example, the animations can be enabled in an enterprise application for all UI animation control selections (e.g., referring to FIG. 1B, the full option 114a, the basic option 114b, and the minimal option 114c). The animations may not consume significant backend or system computing resources of a computing device executing the enterprise application. In addition, the animations can be considered non-extra battery commands when the enterprise application is running in a mobile computing device.

Navigating between pages in an animated manner can include providing (drawing) parts of the page in a UI one at a time sequentially until the full page is provided (drawn). Each animation mode of operation can be associated with an animation action. An animation mode of operation is determined by the selected UI animation control option. In the examples described with reference to FIGS. 2A-D, a full animation mode of operation is the animation mode of operation implemented by the enterprise application based on the selection of the full option 114a. A basic animation mode of operation is the animation mode of operation implemented by the enterprise application based on the selection of the basic option 114b. A minimal animation mode of operation is the animation mode of operation implemented by the enterprise application based on the selection of the minimal option 114c.

Figure 2A:
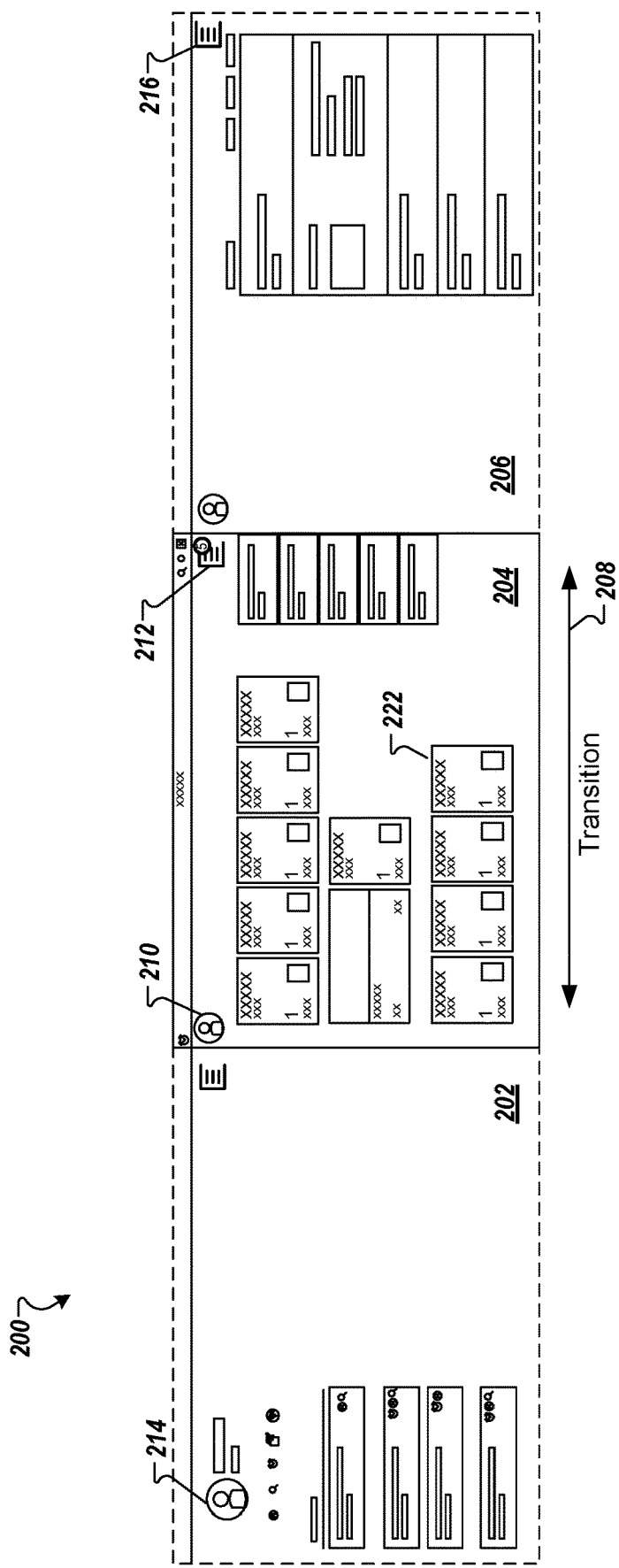
FIGS. 2A-D show example user interfaces (UI) for non-performance critical front-end only animations for an enterprise application.

FIG. 2A shows example user interfaces 200 for a front-end animation for navigating between a me area page 202, a launchpad page 204, and a notifications page 206. A transition axis 208 shows the animation as providing a horizontal transition (along an x-axis) between the pages of the enterprise application. For example, the UI 200 can be considered a class one front-end animation. The animation can allow a user to quickly navigate between the three pages. For example, a user can select an image icon 210 to navigate in an animated manner from the launchpad page 204 to the me area page 202. The user can select an image icon 214 to navigate in an animated manner from the me area page 202 back to the launchpad page 204. The user can select a notification icon 212 to navigate in an animated manner from the launchpad page 204 to the notifications page 206. The user can select a notification icon 216 to navigate in an animated manner from the notifications page 206 to the launchpad page 204. Animation can provide an indication of the spatial placement of the content of a page in the launchpad page 204.

In some implementations, a full animation mode of operation for the navigation transition between the me area page 202, the launchpad page 204, and the notifications page 206 can be associated with an animation action where the animation is a translation along the transition 208 that includes both scaling and opacity. For example, the animated transition from the launchpad page 204 to the notifications page 206 includes a scaling of the content (e.g., the content can grow as the notifications page 206 is drawn) and a change in the opacity of the content (e.g., the opacity of the content of the page can increase (e.g., transition from transparent to opaque) as the notifications page 206 is drawn).

In some implementations, a basic animation mode of operation for the navigation transition between the me area page 202, the launchpad page 204, and the notifications page 206 can be associated with an animation action where the animation is a translation along the transition 208. In some implementations, a minimal animation mode of operation for the navigation transition between the me area page 202, the launchpad page 204, and the notifications page 206 can be associated with an animation action where the animation is a translation along the transition 208.

Figure 2B:
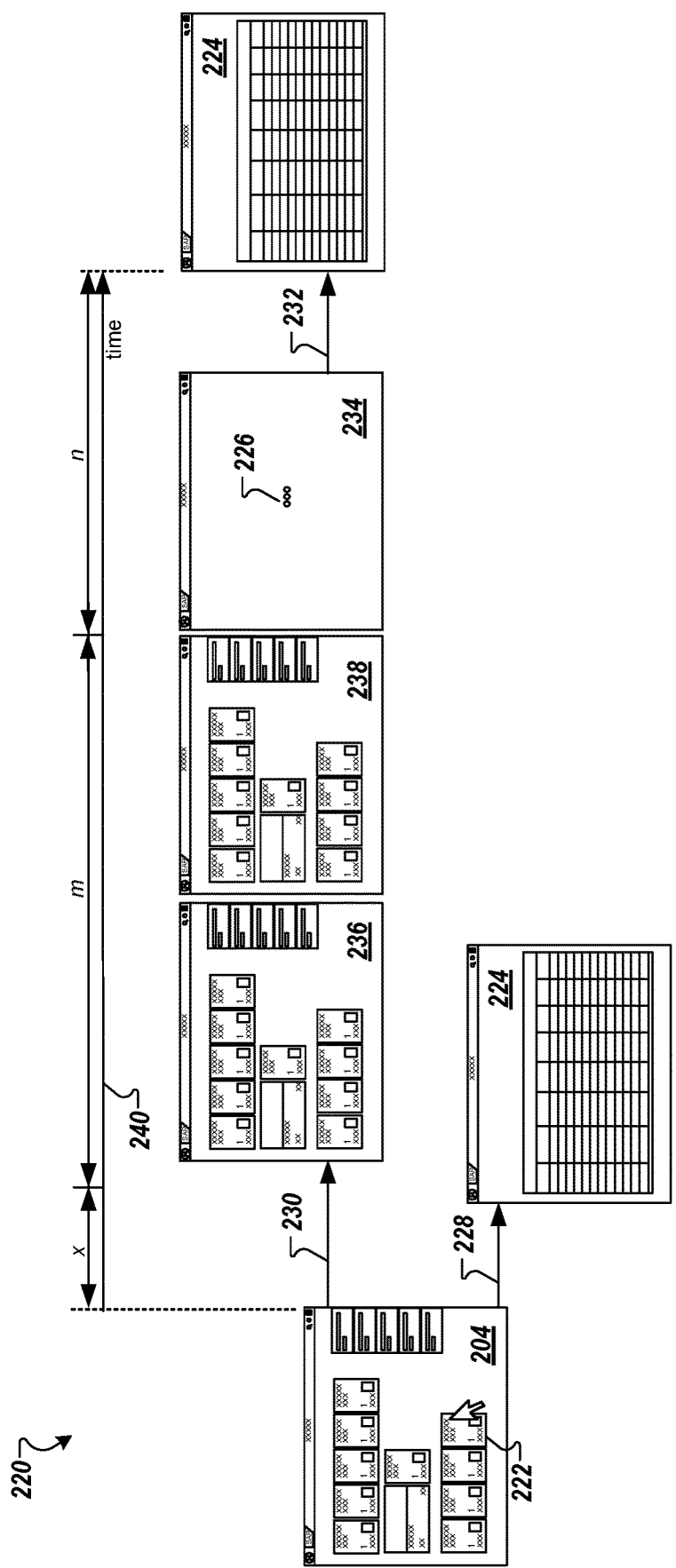

FIG. 2B shows example user interfaces 220 for a front-end animation for loading an application and performing a page transition. For example, a user may select a tile (e.g., tile 222) from the launchpad page 204 launching an application in an application page 224. A tile can be an icon that, when selected, can launch an application. In this example, a zoom animation can be performed when opening the application in the application page 224. The zoom animation can be for the opening of a new page (e.g., the application page 224). The zoom animation can provide a visual indicator, to the user of the navigation, to new content. The zoom can be representative of the animation action by scaling up the content of the application page 224 while making it visible to the user.

For example, a time axis 240 shows a time progression from the selection of the tile 222 to the opening of the application in the application page 224. If a time to load the application page is less than x milliseconds (msec.), the opening of the application in the application page 224 will be animated and proceed from the launchpad page 204 to the application page 224 as indicated by arrow 228. For example, x msec. can be 100 msec.

If a time to load the application page 224 is greater than x milliseconds (msec.), the opening of the application in the application page 224 will be animated and proceed from the launchpad page 204 being visible to the user for m msec. to the providing of a busy indicator 226 on a placeholder page 234 that is visible to the user for n msec. to the providing of the application page 224, as shown by arrow 230 and arrow 232. For example, the launchpad page 204 can be visible to the user for 450 msec. (m=450) and the busy indicator 226 on the placeholder page 234 can be visible to the user for the amount of time it takes to load the application page (e.g., n msec.). In some implementations, the providing of the busy indicator 226 can be animated.

In some implementations, when the time to load the application page 224 is greater than x msec., a full animation mode of operation for the navigation transition from the launchpad page 204 to the application page 224 can be associated with an animation action where the launchpad page 204 can be visible to the user at different opacity scales or levels, as shown for example by first opacity level launchpad page 236 and second opacity level launchpad page 238. For example, the animated transition from the launchpad page 204 to the application page 224 can also include the placeholder page 234 that includes the busy indicator 226.

In some implementations, when the time to load the application page 224 is greater than x msec., a basic animation mode of operation for the navigation transition from the launchpad page 204 to the application page 224 can be associated with an animation action where a white screen (a white page with no scaling) is visible to the user and includes non-animated version of a busy indicator. In some implementations, when the time to load the application page 224 is greater than x msec., a minimal animation mode of operation for the navigation transition from the launchpad page 204 to the application page 224 can be associated with an animation action where a white screen (a white page with no scaling) is visible to the user and includes a non-animated version of a busy indicator.

Figure 2C:
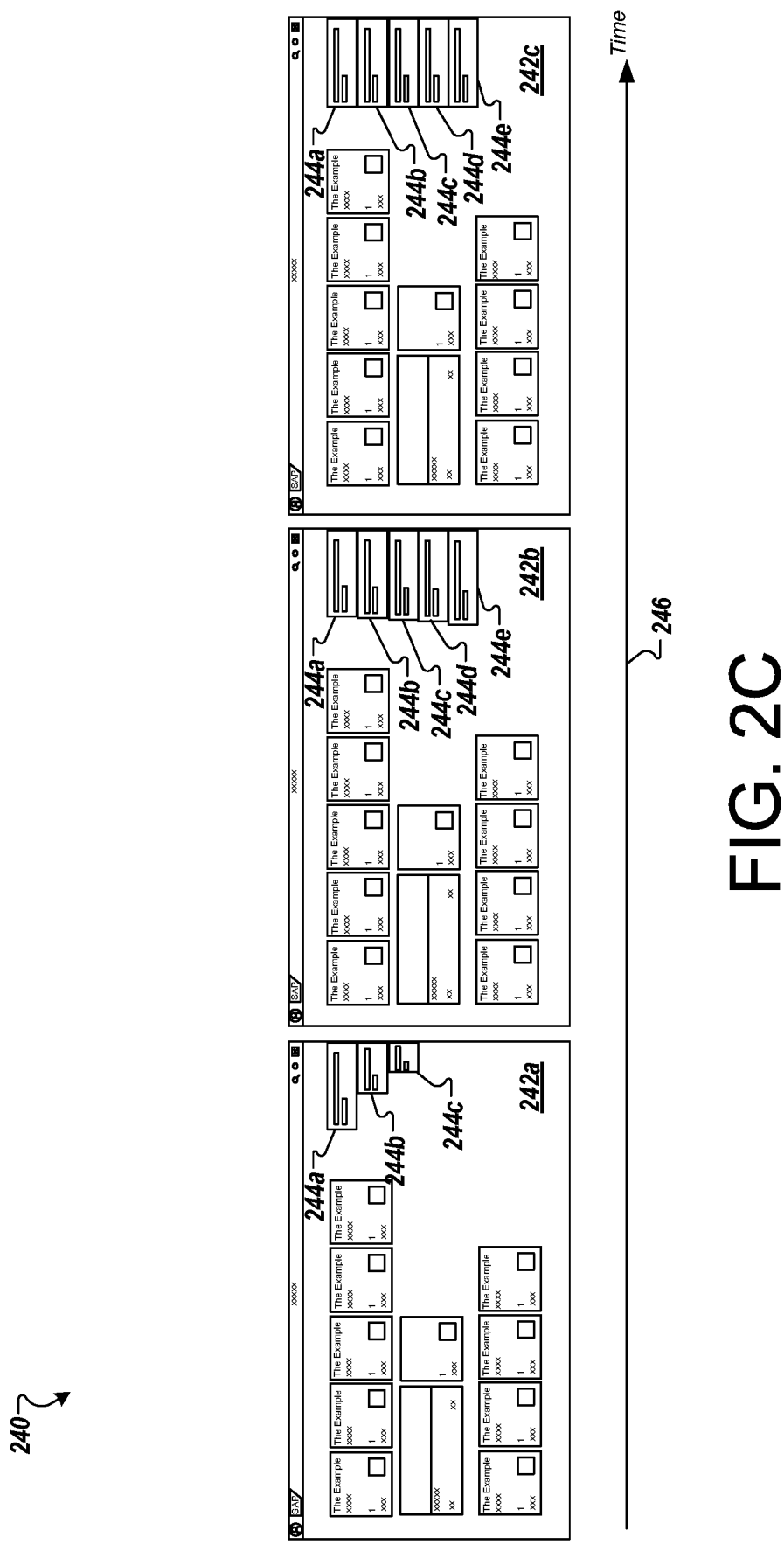

FIG. 2C shows example user interfaces 240 for a front-end animation for receiving notifications. For example, a user may launch an application (e.g., an enterprise application). Upon launching, the application can provide a UI that includes one or more notification cards 244a-e arranged in, for example, a column. A notification card can be automatically received and arranged for presenting (displaying) along with other notification cards. When the application receives a new notification, a notification card (e.g., notification card 244e) is created for display in the UI 240 along with any other previously displayed notification cards (e.g., notification cards 244a-d). When a new notification card is received for display, the notification cards (previously displayed and the new notification card) are rearranged. FIG. 2C shows the animation of the rearranging of the notification cards over time (as shown by arrow 246). The sequentially displayed launchpad pages 242a-c show the animation of the rearranging of the notification cards. In some implementations, the animation of the rearranging of the notification cards as shown in the sequentially displayed launchpad pages 242a-c can be in the order of 250 to 300 msec.

In some implementations, a full animation mode of operation and a basic animation mode of operation for the animation of the displaying of notification cards can each be associated with an animation action where there is a delay between the displaying of a first notification card (e.g., notification card 244a) and a last notification card (e.g., notification card 244e). In some implementations, a minimal animation mode of operation for the animation of the displaying of notification cards can each be associated with an animation action where there is no delay between the displaying of a first notification card (e.g., notification card 244a) and a last notification card (e.g., notification card 244e). All of the notification cards 244a-e can be displayed at the same time.

Figure 2D:
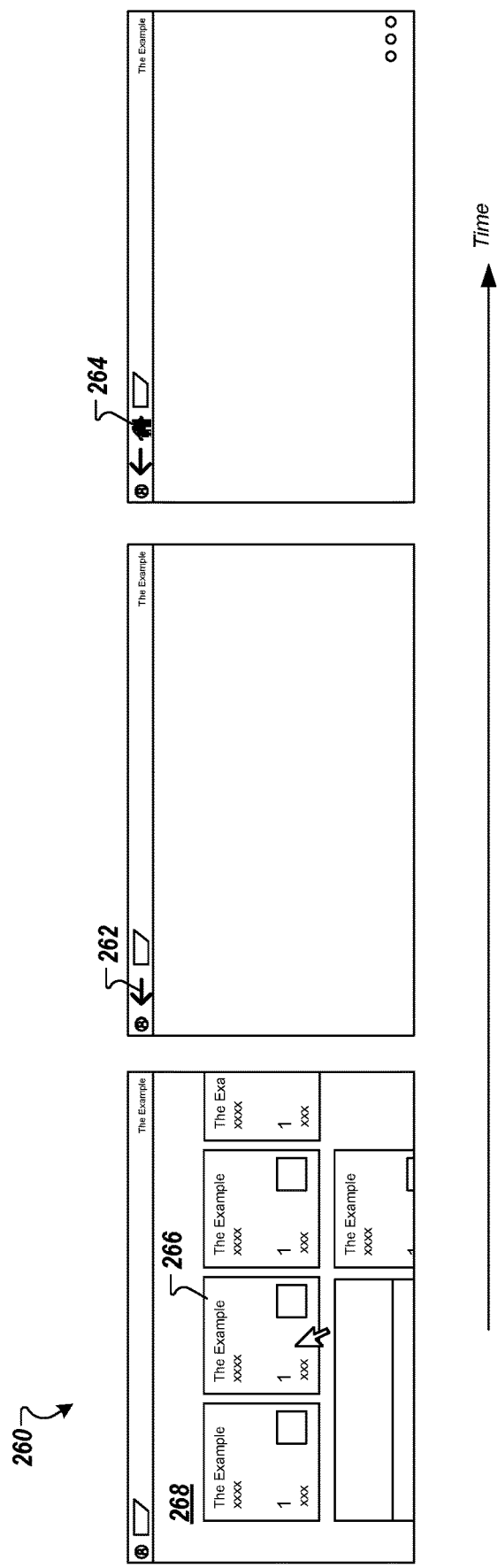

FIG. 2D shows example user interfaces 260 for a front-end animation to reveal a back button icon 262 and a home button icon 264. For example, when navigating back to a launchpad page 268 from other pages in an enterprise application, a back button icon and a home button icon may not be visible on the launchpad page. For example, a user may select a tile (e.g., tile 266) from the launchpad page 268. The selection of the tile 266 can result in the launching of an application page. While preparing to launch the application page, the front-end animation can display the back button icon 262 and the home button icon 264 while the application page is loading.

In some implementations, a full animation mode of operation and a basic animation mode of operation for the animation of the displaying of the back button icon 262 and the home button icon 264 can each be associated with an animation action where the back button icon 262 and the home button icon 264 are sequentially displayed. In some implementations, a minimal animation mode of operation for the animation of the displaying of the back button icon 262 and the home button icon 264 can be associated with an animation action where the back button icon 262 and the home button icon 264 are displayed together (at the same time).

Figure 3:
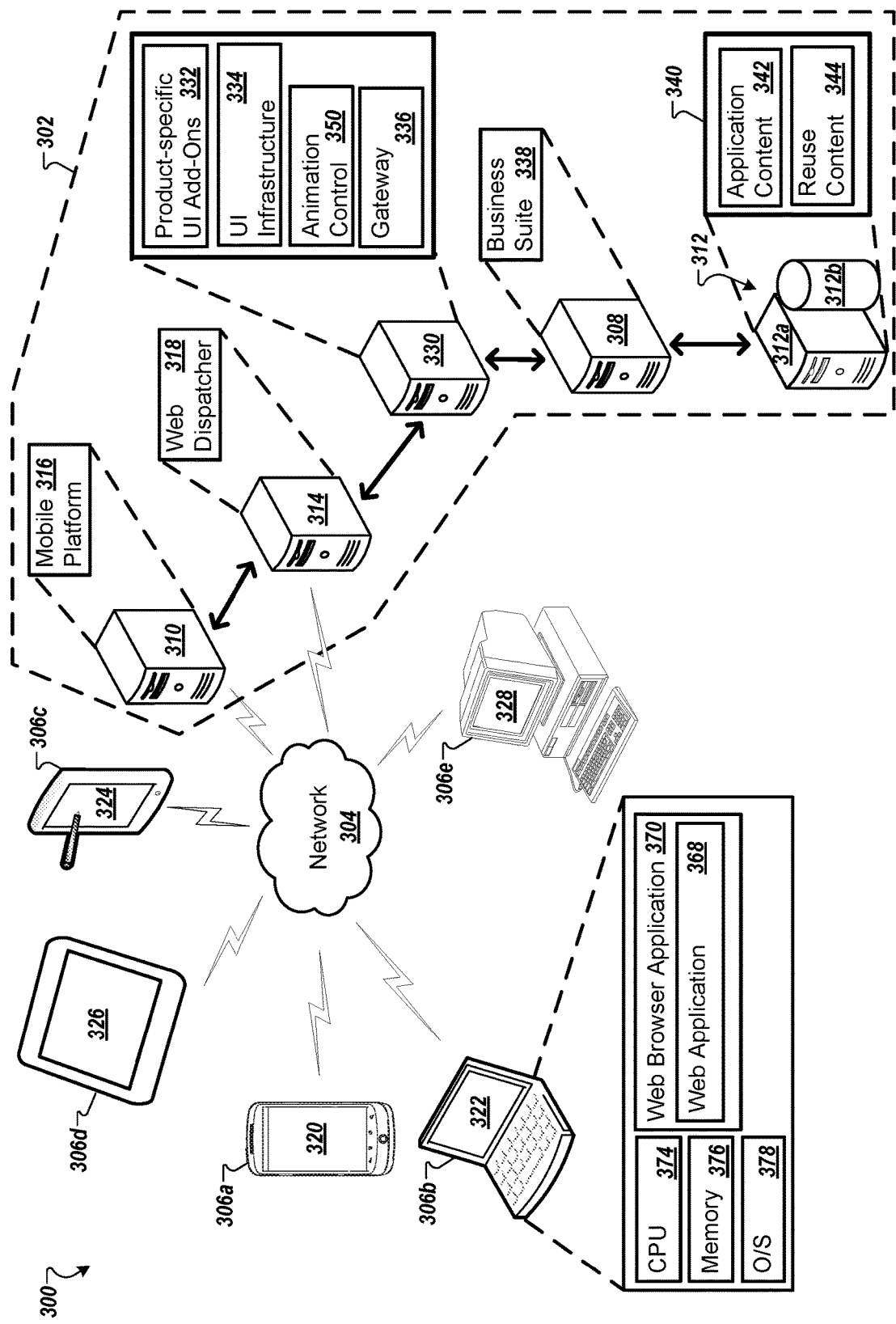
FIG. 3 is a diagram of an example system that can implement user interfaces for animations for an enterprise application.

FIG. 3 is a diagram of an example system 300 that can implement user interfaces for animations for an enterprise application as described herein. The system 300 includes an enterprise computing system 302, a network 304, and client computing devices 306a-e.

For example, computing device 306a can be a mobile phone, a smartphone, a personal digital assistant, or other type of mobile computing device. The computing device 306a includes a display device 320. For example, computing device 306b can be a laptop or notebook computer. The computing device 306b includes a display device 322. For example, computing device 306c can be a tablet computer. The computing device 306c includes a display device 324. For example, the computing device 306d can be a wearable device such as a smartwatch. The computing device 306d includes a display device 326. For example, the computing device 306e can be a desktop computer. The computing device 306e can include a display device 328. A user of the computing devices 306a-e can use/interface with the display devices 320, 322, 324, 326, and 328, respectively, when interacting with the enterprise computing system 302. The computing devices 306a-e can display on the display devices 320, 322, 324, 326, and 328 any of the screens and UIs described herein.

The enterprise computing system 302 can include one or more computing devices such as a web management server 314, a frontend server 330, a backend server 308, and a mobile device management server 310. The enterprise computing system 302 can also include a database management computing system 312 that includes a database management server 312a and a database 312b. Though not specifically shown in FIG. 3, each server (the web management server 314, the frontend server 330, the backend server 308, the mobile device management server 310, and the database management server 312a) can include one or more processors and one or more memory devices. Each server can run (execute) a server operating system.

In some first implementations, the client computing devices 306a-d (e.g., the mobile computing devices) can communicate with the enterprise computing system 302 (and the enterprise computing system 302 can communicate with the client computing devices 306a-d) by way of the mobile device management server 310. The mobile device management server 310 includes one or more mobile device platform application(s) 316. By using the mobile device platform application(s) 316, the enterprise computing system 302 can deliver cross-platform, secure, and scalable applications to the computing devices 306a-d, independent of the mobile computing device-type (e.g., laptop, notebook, smartwatch, mobile phone, PDA, etc.) and independent of the operating system running on the computing device 306a-d. In these implementations, the mobile device management server 310 can then communicate with the web management server 314.

In some second implementations, the client computing devices 306a-e (both the mobile computing devices (computing devices 306a-d) and the desktop computing device 306e) can communicate with the enterprise computing system 302 (and specifically with the web management server 314), and the enterprise computing system 302 (and specifically with the web management server 314) can communicate with each of the client computing devices 306a-e) using the network 304. The web management server 314 includes a web dispatcher application 318. In both the first implementations and the second implementations, the web dispatcher application 318 can act as a "software web switch" accepting or rejecting connections to the enterprise computing system 302.

In some implementations, the network 304 can be a public communications network (e.g., the Internet, cellular data network, dialup modems over a telephone network) or a private communications network (e.g., private LAN, leased lines). In some implementations, the computing devices 306a-e can communicate with the network 304 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

The frontend server 330 can include product specific UI Add-On Applications 332 and a UI infrastructure 334. The UI infrastructure 334 can include a design portion and a runtime portion. The frontend server 330 can decouple a lifecycle of a UI (e.g., design and runtime deployment) from the backend server 308. The decoupling can allow UI applications to interface with a plurality of different databases. The decoupling provides a single point of UI design, access, and maintenance allowing for theming, branding, configuring, and personalizing a UI without a need for development privileges to the backend server 308 (e.g., no need to have backend administrative rights). The decoupling can result in a more secure enterprise computing system. The decoupling can provide for rule-based dispatching of requests in a multi-system landscape (e.g., for approvals including aggregation).

An animation control module 350 can include hardware and software for implementing the animation controls described herein. In some implementations, referring to FIG. 1B, the selection for the UI animation control 108 can be stored in memory included in the front end server 330. In some implementations, the selection for the UI animation control 108 can be stored in memory included in the front end server 330. In some implementations, the selection for the UI animation control 108 can be stored in a database 312b.

The frontend server 330 includes a gateway 336. The gateway 336 can provide a way to connect devices, environments, and platforms to enterprise software based on market standards. The gateway 336 can enable the development of UIs for use in different environments (e.g., social and collaboration environments). The gateway 336 can enable the development of UIs for use on different types of client computing devices (e.g., client computing devices 306a-e). The gateway 336 can enable the development of UIs for use in internet-based applications.

The backend server 308 can include a bundle (a set) of business applications (e.g., business suite 338). The business applications can be transactional applications, analytical applications, or fact sheet and contextual navigation applications. Transactional applications can allow task-based access to tasks that can include create and change. In addition or in the alternative, transactional applications can allow access to entire processes with guided navigation. Analytical applications can provide a user with a visual overview of complex tasks for monitoring and tracking purposes. Fact sheet applications and contextual navigation applications involve search and explore activities. Fact sheet applications and contextual navigation can allow a user to view essential information about an object and can allow contextual navigation between related objects.

The database management computing system 312 includes a database management server 312a that can run (execute) applications that can manage the database 312b. For example, the database 312b can be an in-memory, column-oriented, relational database (e.g., SAP HANA®). The database management computing system 312 can include extended application services 340 that can embed a full featured application server, web server, and development environment within the database management computing system 312. The extended application services 340 can include application content 342 and reuse content 344 for use by the enterprise computing system 302 when providing a personalized, responsive, and simple UX across different types of computing devices and deployment options.

As described herein, the user interfaces can be displayed on the display device 320, the display device 322, the display device 324, the display device 326, and the display device 328 of the respective client computing device 306*a-e*.

For example, a user can use one or more of the computing devices 306*a-e* to execute a software application and control the amount of animation and micro-interactions for the application. For example, the software application can be a web application 368. The computing device 306*b* can include one or more processors (e.g., a client central processing unit (CPU) 374) and one or more memory devices (e.g., a client memory 376). The computing device 306*b* can execute a client operating system (O/S) 378 and one or more client applications, such as a web browser application 370. The web browser application 370 can display a user interface (UI) (e.g., a web browser UI and one or more of the UIs described herein) on the display device 322 included in the computing device 306*b*.

Though the CPU 374, the memory 376, the O/S 378, the web browser application 370 and the web application 368 are shown as included in the computing device 306*b*, similar circuits, devices, modules, and applications can be included in each of the computing devices 306*a*, and 306*c-e*.

For example, Cascading Style Sheets (CSS) can be used to modify the visual representation of Document Object Model (DOM) elements in an application programming interface (API) for a document page of an application. A CSS Object Model (CSSOM) can be a set of APIs that allows the manipulation of CSS from JavaScript. A CSSOM can be considered a map of the CSS styles included on a web page. A CSSOM allows for the dynamic reading and modifying of a CSS style. A CSSOM can be used in the rendering of a web page by a web browser application (e.g., the web browser application 370). A web browser application can use a CSSOM combined with a DOM to display a web page.

FIG. 5 shows an example of program code 500 for a software application (e.g., an enterprise application) that enables an animation by setting a name of the animation (e.g., animation name 502, animation name 504). A DOM can define a logical structure for a document. A DOM can define how a document can be accessed and manipulated. A transition/animation property for a DOM element can be used in order to enable/disable animations for the DOM element. Animation for a DOM element can be enabled by setting the name of an animation for the DOM element.

By setting an animation property for a DOM element to none, the animation for a DOM Element can be disabled. Adding an animation property to a parent DOM element provide the possibility to enable/disable animation for a group of DOM Elements.

FIG. 6 shows an example of program code 600 for a software application (e.g., an enterprise application) that shows how animations can be turned off at a control level. For example, adding an animation—off class 602 shown by the program code 600 to a viewport component included in a software application can disable animations. For example, a viewport can be a single screen displayed on a display device (e.g., the display device 322) of a computing device (e.g., the computing device 306*b*) that can be partitioned into multiple function areas, can include a toolbar, and can provide a user with access to application information. A viewport can provide a user with a UX and a UI that includes the business functionalities and enterprise application-to-application navigations needed by the user without disrupting a context of a current task of the user.

FIG. 7 shows an example of program code 700 for a software application (e.g., an enterprise application) that shows how a basic mode of animation can be implemented in the software application. For example, as described with reference to FIGS. 1A-B, the selection of the basic option 114*b* can enable some but not all of the animations and micro-interactions for the application to be shown to the user. For example, adding an animation—light class 706 shown by the program code 700 to a viewport component included in a software application can enable the use of light animations (e.g., some but not all animations will be implemented). Animation can be enabled by setting an animation name 702 and an animation name 704.

FIG. 8 shows an example of program code 800 for a software application (e.g., an enterprise application) that shows how adding the animation—light class 706 to the viewport can lead to a replacement of the animation name for the viewport.

FIG. 9 shows an example of program code 900 for a software application (e.g., an enterprise application) that shows how switching an animation mode in a me area (e.g., the me area 202 as shown in FIG. 2A) can trigger an event to modify an animation type. For example, referring to FIGS. 1A-B, the accessibility control section 106 that includes the selectable UI animation control 108 can be included in the me area 202.

FIG. 10 shows an example of program code 1000 for a software application (e.g., an enterprise application) that shows an animationSwitch class 1002 that can be used to persist settings when an animation type is changed.

In some situations, a user may use multiple types of computing devices as shown by the computing devices 306*a-e* as shown in FIG. 3. In addition or in the alternative, a user may use different browsers on different computing devices. In order to provide a beneficial level of animation for an enterprise application, the animation control can differentiate between different levels of animation based on, for example, the current computing device being used by the user. A reason for a device dependent persistent can be dependent on the battery life of the computing device, the screen size of the computing device, and the processing capabilities of the computing device (e.g., a graphics processor (GPU), a central processing unit (CPU), memory (RAM), etc.).

For example, a device object accessible in a global scope can read information about a device object to determine a computing device type. A browser object can include information about a browser version, a rendering engine, and about the browser that is in use.

Figure 11:
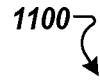
FIG. 11 shows an example of program code for a software application that shows information that can be persisted in a database and for an individual user.

FIG. 11 shows an example of program code 1100 for a software application (e.g., an enterprise application) that shows information that can be persisted in a database (e.g., the database 312*b*) and for (in association with) an individual user. For example, referring to FIG. 3, a user can set an animation type to light (e.g., select the basic option 114*b* as shown in FIG. 1B) on a MacBook® (e.g., the computing device 306*b*) where Google Chrome® is used as a web browser application (e.g., the web browser application 370). The information can then be persisted in a database (e.g., the database 312*b*) and for the individual user. When a web page is loaded for the web application (e.g., an enterprise application, the web application 368) running in the web browser application (e.g., the web browser application 370) the information stored in the database (e.g., the database 312b) is retrieved from a backend (e.g., the database management computing system 312).

A UX can be enhanced by using animations and micro-interactions. An enterprise application can implement micro-interactions for dynamic buttons and/or for new page transitions. A micro-interaction can provide a user with feedback (e.g., an animation of the feedback) of an interaction with a user control included in a UI. For example, an animation can communicate a status, provide feedback, and help in the visualization of results of a micro-interaction of a user with a control included in a UI. In some implementations, animations can allow a user to navigate quickly between user interfaces for an application, providing spatial placement of content in the user interface. In some implementations, the use of animations and micro-interactions can affect the performance of an application. In particular, some transitions or animated objects can require a significant use of computing resources of computing device. The use of these resources may negatively affect the UX.

There can be a variety of factors to consider when deciding about the use of animation and micro-interactions in a UX. For example, a user may want to limit or, in some cases, disable the use of animation and/or micro-interactions based on one or more of these factors. The factors can include, but are not limited to, a user having motion sickness, the effect of the use of animations and micro-interactions on the perceived performance of the application by the user, the effect of the use of animations and micro-interactions on the efficiency of the user when interacting with the UI of the application, and the effect of the use of animations and micro-interactions on the performance of the computing device (e.g., battery life).

In some implementations, an enterprise application can implement animation and micro-interactions that do not conflict with content rendering or scripting activities in order to have a positive impact on a perceived performance of the enterprise application by a user. Animation and micro-interactions can be implemented to consume a minimal amount of computing resources, for example, running during idle times on a computing device. Animation can be a process that provides a user with a visual illusion of motion and change by displaying a sequence of images that minimally differ from one another.

Figure 4:
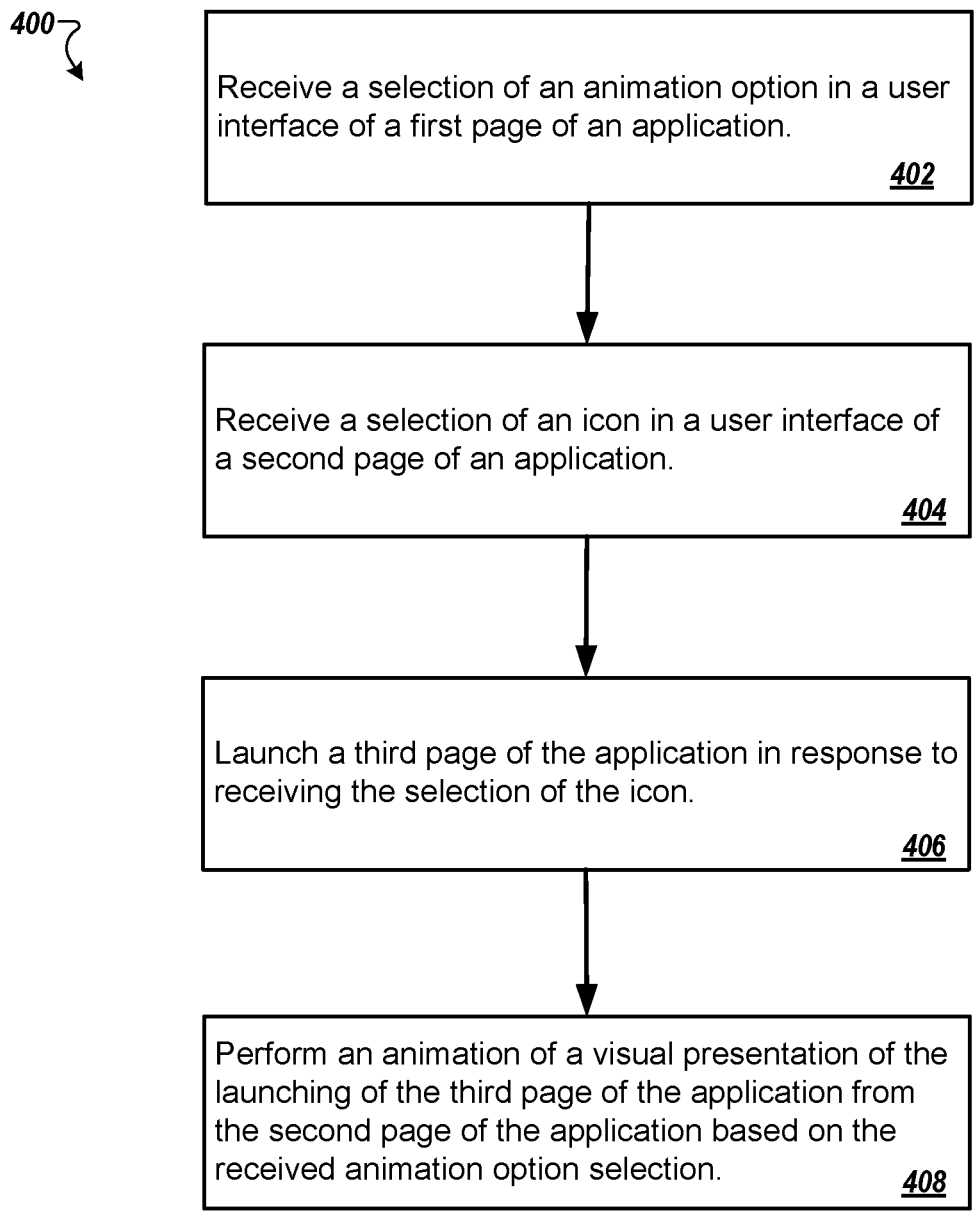
FIG. 4 is a block diagram of a flowchart showing an example method 400 for animating a visual presentation of a page of an application.

FIG. 4 is a block diagram of a flowchart showing an example method 400 for animating a visual presentation of a page of an application. In some implementations, the systems and processes described herein can implement the method 400.

A selection of an animation option is received in a user interface of a first page of an application executing on a computing device (block 402). For example, referring to FIG. 1B, the selection of the minimal option 114c can be received from the pull-down menu 112 for the UI animation control 108 included in the settings UI 100.

A selection of an icon can be received in a user interface of a second page of the application executing on the computing device (block 404). For example, referring to FIG. 2B, the selection of the tile 222 can be received from the launchpad page 204. A third page of the application is launched in response to receiving the selection of the icon (block 406). For example, referring to FIG. 2B, the application page 224 is launched.

An animation of a visual presentation of the launching of the third page of the application from the second page of the application is performed (block 408). The animation is based on the received animation option selection. For example, referring to FIG. 2B, depending on the time to load the application page 224, the animation of the visual presentation of the launching of the application page 224 can include presenting the launchpad page 204 to the user at different opacity scales or levels, as shown for example by first opacity level launchpad page 236 and second opacity level launchpad page 238. The animated transition from the launchpad page 204 to the application page 224 can also include the placeholder page 234 that includes the busy indicator 226.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method comprising:
  receiving, in a user interface of a first page of an application executing on a computing device, a selection of an animation option from a list of animation options;
  receiving, in a user interface of a second page of content within the application executing on the computing device, wherein the second page of content is different than the first page of the application, a selection of an icon;
  in response to receiving the selection of the icon:
    launching a third page of content within the application, wherein the third page of content is different than the first and second pages, and wherein launching comprises:
      performing an animation of a visual presentation of the third page of content, wherein the animation provides a transition between the second page of content and the third page of content, and wherein the animation is based on the received animation option selection; and
      displaying, following completion of the animation, the third page of content on the computing device.

2. The method of claim 1, wherein the animation option is one of a full option, a basic option, or a minimal option.

3. The method of claim 1, further including identifying an animation mode of operation based on the received animation option selection.

4. The method of claim 3, wherein an animation action is associated with the identified animation mode of operation.

5. The method of claim 4, wherein the animation action determines a type of animation of the visual presentation of the launching of the third page of the application.

6. The method of claim 1, wherein the animation is based on the received animation option selection, and is further based on a type of the computing device and a particular application executing on the computing device.

7. The method of claim 1, wherein the visual presentation includes a busy indicator.

8. A non-transitory, machine-readable medium having instructions stored thereon, the instructions, when executed by a processor, cause a computing device to:
  receive, in a user interface of a first page of an application executing on a computing device, a selection of an animation option from a list of animation options;
  receive, in a user interface of a second page of content within the application executing on the computing device, wherein the second page of content is different than the first page of the application, a selection of an icon;
  in response to receiving the selection of the icon:
    launch a third page of content within the application, wherein the third page of content is different than the first and second pages, and wherein launching comprises:
      performing an animation of a visual presentation of the third page of content, wherein the animation provides a transition between the second page of content and the third page of content, and wherein the animation is based on the received animation option selection; and
      displaying, following completion of the animation, the third page of content on the computing device.

9. The medium of claim 8, wherein the animation option is one of a full option, a basic option, or a minimal option.

10. The medium of claim 8, wherein the instructions, when executed by the processor, further cause the computing device to identify an animation mode of operation based on the received animation option selection.

11. The medium of claim 10, wherein an animation action is associated with the identified animation mode of operation.

12. The medium of claim 11, wherein the animation action determines a type of animation of the visual presentation of the launching of the third page of the application.

13. The medium of claim 8, wherein the animation is further based on the received animation option selection, and is further based on a type of the computing device.

14. The medium of claim 8, wherein the visual presentation includes a busy indicator.

15. A system comprising:
  a computer system including an animation control module; and
  a computing device including a display device, the computing device configured to:
    receive, in a user interface of a first page of an application executing on a computing device, a selection of an animation option from a list of animation options;
    provide the selected animation option to the computer system for use by the animation control module;
    receive, in a user interface of a second page of content within the application executing on the computing device, wherein the second page of content is different than the first page of the application, a selection of an icon;
    in response to receiving the selection of the icon:
      launch a third page of content within the application, wherein the third page of content is different than the first and second pages, and wherein launching comprises:
        performing an animation of a visual presentation of the third page of content, wherein the animation provides a transition between the second page of content and the third page of content, and wherein the animation is based on the received animation option selection; and
        displaying, following completion of the animation, the third page of content on the computing device.

16. The system of claim 15, wherein the selected animation option is stored in a database accessible by the computer system.

17. The system of claim 15, wherein the animation option is one of a full option, a basic option, or a minimal option.

18. The system of claim 15, wherein the animation control module is configured to identify an animation mode of operation based on the selected animation option.

19. The system of claim 18,
wherein the animation control module is further configured to associate an animation action with the identified animation mode of operation, and
wherein the animation action determines a type of animating of the visual presentation of the launching of the third page of the application from the second page of the application is performed by the computing device.

20. The system of claim 15, wherein the animation is further based on the received animation option selection, and is further based on a type of the computing device.

* * * * *